United States Patent [19]

Muschelknautz

[11] Patent Number: 5,390,697
[45] Date of Patent: Feb. 21, 1995

[54] COMBINATION VALVE

[75] Inventor: Claudius Muschelknautz, Lauf, Germany

[73] Assignee: Robert Bosch GmbH, Stuttgart, Germany

[21] Appl. No.: 203,019

[22] Filed: Feb. 28, 1994

[30] Foreign Application Priority Data

Mar. 12, 1993 [DE] Germany .............. 4307798

[51] Int. Cl.⁶ .............................................. F16K 15/14
[52] U.S. Cl. .................................... 137/494; 60/307; 137/852; 251/61.3; 251/82
[58] Field of Search .................. 60/307; 137/852, 859, 137/494; 251/61.3, 82

[56] References Cited

U.S. PATENT DOCUMENTS

| | | | |
|---|---|---|---|
| 5,203,872 | 4/1993 | Naffziger | 251/82 |
| 5,301,504 | 4/1994 | Bertling | 60/307 |

FOREIGN PATENT DOCUMENTS 4204415 8/1993 Germany.

*Primary Examiner*—Robert G. Nilson
*Attorney, Agent, or Firm*—Michael J. Striker

[57] ABSTRACT

A combination valve has a pneumatically actuated shut-off valve integrated in a valve housing and operative for blocking and releasing a flow between a valve inlet and a valve outlet. The shut-off valve has a valve member which is spring loaded in a valve closing direction. A check valve is integrated in the valve housing, provides blocking of the flow from the valve outlet to the valve inlet and has a closing member formed by a flat spring. A stroke guard limits an opening stroke of the closing member. The valve member of the shut-off valve is arranged at a side of the flat spring which faces the valve outlet and forming the stroke guard of the check valve. A valve plunger is axially guided in the valve housing and centrally extending through the flat spring, and control piston with which the valve member is connected through the valve plunger is loaded with a suction pressure for opening the shut-off valve and ventilated for closing the shut-off valve.

14 Claims, 3 Drawing Sheets

5,390,697

COMBINATION VALVE

BACKGROUND OF THE INVENTION

The present invention relates to a combination valve, particularly for a secondary air blower in internal combustion engines with a controlled three-way catalyst.

Such combination valves or combo-valves contain a shut-off valve and a check valve in a valve housing and serve for switching the secondary air stream for the exhaust gas line of internal combustion engines with controlled three-way catalysts. With such a blower, or so-called secondary air blower, fresh air is supplied before the catalyst to the exhaust gas line of the internal combustion engine for providing a post-combustion of the exhaust gas at temperatures of over 600° C. in the line. The post-combustion reduces hydrocarbon compounds and the carbon monoxide contained in the exhaust gas. Moreover, the post-combustion supplies heat to the catalyst, which is very important for the cold start.

During the operation of the secondary air blower the shut-off valve is opened and the secondary air is blown after passing through open check valve into the exhaust gas line of the internal combustion engine. The check valve has the function to prevent a return stream of the exhaust gas through the blower during a pressure increase in the exhaust gas line. The shut-off valve prevents a suction of secondary air caused by pressure pulsations during stoppage of the secondary air blower.

In a combi-valve of the above mentioned type it has been proposed to load the valve member of the shut-off valve in a valve opening direction with a differential pressure between a valve inlet pressure and a surrounding pressure and to provide a flat spring associated with the valve plate with a plurality of valve openings which are covered by the flat spring in its closing position. This is disclosed for example in the German document DE 42 04 425.4. The flat spring has a plurality of spirals which are punched in it and is centrally clamped between the valve plate and the stroke guard. For this purpose the flat spring has only a low restoring force so that only low pressure losses during a throughflow through the combi-valve occur. Due to the low mass inertia of the flat spring a fast reaction of the check valve is guaranteed.

During the operation of such a combination valve in a secondary air circuit of an internal combustion engine has been shown that the check valve in certain operational conditions of the internal combustion engine, for example during fast load engage, can be untight. As a result, after switching off of the secondary blower the shut-off valve no longer closes since pressure acting on the valve member of the shut-off valve through the untight check valve remains open at the valve outlet of the valve member of the shut-off valve.

SUMMARY OF THE INVENTION

Accordingly, it is an object of the present invention to provide a combination valve of the above mentioned general type, which avoids the disadvantages of the prior art.

In keeping with these objects and with others which will become apparent hereinafter, one feature of the present invention resides, briefly stated, in a combination valve in which the valve member of the shut-off valve is arranged at the side of the flat spring which faces the valve outlet and forms a stroke guard of a check-valve and the valve member is connected through a valve plunger which is guided in a valve housing and centrally extends through the flat spring, with a control piston which is loaded during opening of the shut-off valve with a suction pressure and is ventilated for opening the shut-off valve.

When the combination valve is designed in accordance with the present invention, it has the advantage that due to the inventive arrangement of the valve member on the side of the sheet spring facing away of the valve opening and facing toward the valve outlet and the inventive construction of the control of the control piston actuating the valve member, in the actuated operational conditions of the internal combustion engine with fast load changes, a blocking of the check valve is suppressed and a return stream of waste gas is reliably prevented. After the shut-off of the secondary air blower, the control piston of the shut-off valve is ventilated so that it is transferred through the valve closing spring to its closing position. Therefore, the flat spring is entrained by the valve member and placed on the valve opening, so that both valves are reliably closed. A pressure increased at the valve outlet acts in addition in a reinforcing manner on the closing position of the check valve and shut-off valve.

In accordance with a preferable embodiment, the control piston is loaded additionally by pressure at the valve input at the piston side facing away from the suction pressure loading. The pressure applied at the valve inlet contributes thereby to the opening of the shut-off valve, so that with switching off for example of the secondary air blower, the closing force of the valve closing spring of the shut-off valve is fast overcome.

In accordance with a further preferable embodiment of the present invention, the control piston limits in a valve housing a first control chamber communicating with a control connection and a second control chamber communicating with the valve inlet, with respective opposite end surfaces of the control piston. The control connection is alternatingly connectable with a negative pressure source and are ventilatable, which for example can be obtained by a magnet valve. The valve plunger of the shut-off valve mounted in the control piston extends through the first control chamber, while a ring seal which surrounds the valve plunger is mounted on the control piston. In the valve opening position of the shut-off valve, it closes the ring gap around the valve plunger remaining at the inlet opening of the valve plunger in the first control chamber. Due to these structural features, the valve outlet side of the combination valve is sealed from the negative pressure control chamber and prevents loading of the negative pressure system with leakage air. The latter is possible only in the switching-off phase of the shut-off valve when the valve member is not located in the closing or end opening position.

In accordance with a further advantageous embodiment of the invention, the flat spring has a central circular closing portion with a central throughgoing opening for the valve plunger, and also several, preferably three, radially extending holding arms which are offset on the closing portion by identical circumferential angles and extend substantially arcuately and concentrically to the closing portion so as to be fixed at their free end in the housing. Therefore, the flat spring forms a bending torsion spring which due to its low mass guarantees a fast response of the check valve or in other words the high inherent frequency of the check valve and allows only low pressure losses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
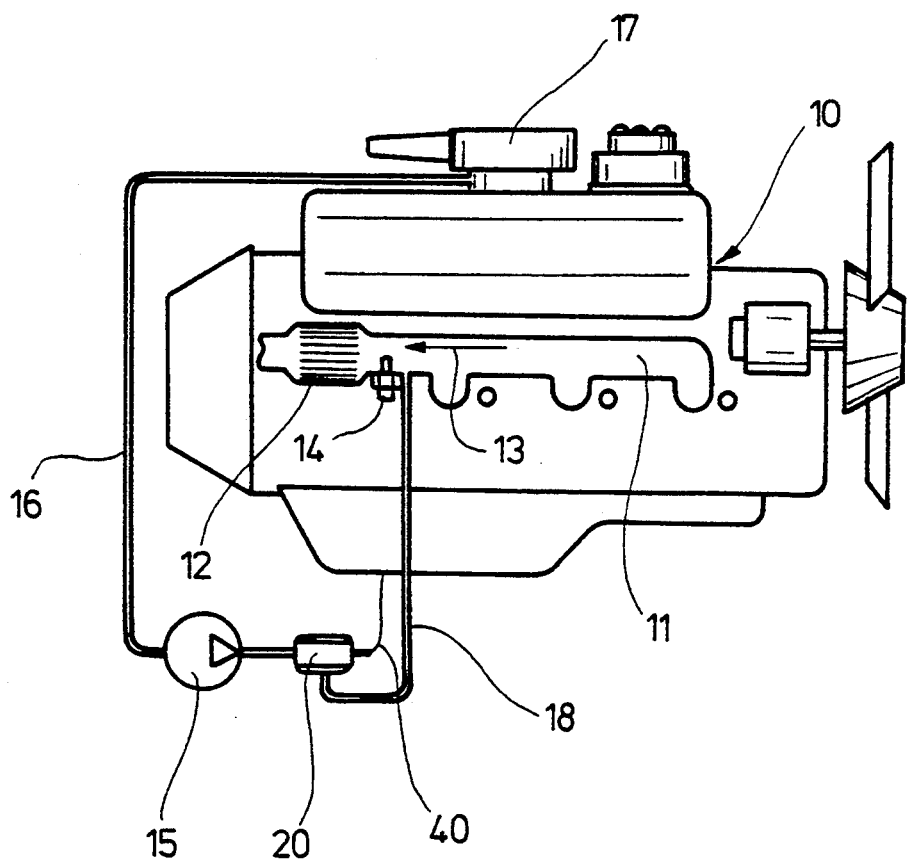
FIG. 1 is a principal view of an internal combustion engine with a control three-way catalyst, a secondary air blower, and a combination valve arranged in its pressure conduit.

An internal combustion engine which is schematically shown in FIG. 1 and identified in general with reference numeral 10 is provided for a motor vehicle and has an exhaust gas line 11 in which a controlled three-way catalyst valve is arranged. The exhaust gas flows in direction of the arrow 13 in FIG. 1. In the flow direction of the exhaust gas, before the catalyst 12, a so-called lambda probe 14 is arranged. A secondary air blower 15 is connected through a suction conduit 16 with a fresh air supply for the internal combustion engine 10, and in particular with an output of an air filter 17. A pressure conduit 18 leads from the blower 15 to the exhaust gas line 18. It opens in a flow direction of the exhaust gas as identified with arrow 13 before the catalyst 12. A so-called combination or combi-valve 20 is arranged at the pressure conduit 18. On the one hand, it prevents a return flow of the exhaust gas through the blower 15 during a pressure increase in the exhaust gas line, and on the other hand it prevents suction of secondary air by pressure pulsations during a stoppage of the blower 15.

Figure 2:
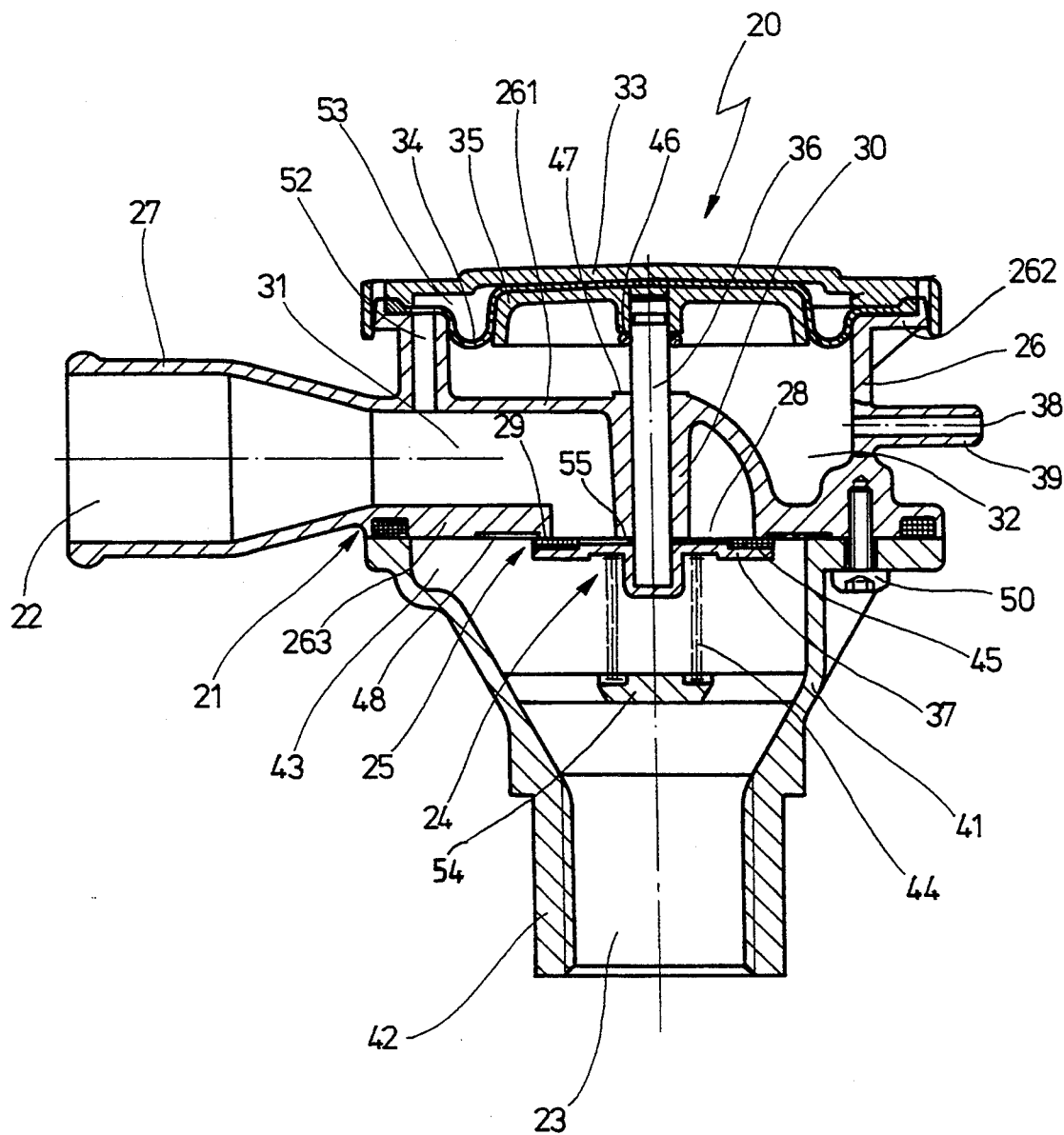
FIG. 2 is a view showing a longitudinal section of a combination valve of the present invention in a closed position.

As can be seen from FIG. 2, a valve housing 21 has a valve inlet 22 and a valve outlet 23 and accommodates a pneumatically actuated shut-off valve 24 and a check valve 25 in a flow path between the air inlet 22 and the air outlet 23. The valve housing 21 is composed of three parts including a cup-shaped central part 26 with the valve inlet 22 arranged radially in its housing wall. The valve inlet 22 is enclosed by a connecting pipe 27 which is formed of one piece with the central part 26 and radially extends from it. A ring-shaped valve opening 28 is formed in a bottom 263 of the central part 26 coaxially to its axis and is enclosed by a valve seat 29 on its outer ring edge. The inner ring edge of the valve opening 24 is formed by a coaxial hollow pin 30 which extends axially and at its end facing away from the valve opening 28 merges of one piece into a substantially transversely extending intermediate wall 261 of the central part 26. The intermediate wall separates a first valve chamber 31 connected with the valve inlet 22 from a second control chamber 32. A ring flange 262 is formed on the cup edge of the central part 26 and is of one piece with the latter, and a cover 33 is mounted on the ring flange 262. A diaphragm 34 is fixedly clamped between the ring flange 262 and the cover 33 and closes the edge of the first control chamber 32. The diaphragm 34 together with the cover 33 forms a second control chamber 53.

The second control chamber 53 communicates with the valve inlet 22 through a passage 52 in the central part 26. At the phase of the diaphragm 34 which faces the control chamber 32, a support piston 35 is mounted and fixedly connected with a perpendicularly projecting coaxial valve plunger 36. The valve plunger 36 extends through the hollow pin 30, it is guided substantially without play in the hollow pin 30, and at its free end projecting outwardly from the hollow pin 30 carries a valve member 37. The valve member 37 cooperates with the valve seat 29 during opening and releasing of the valve opening 28. The valve member 37, the valve plunger 36, the support piston 35, the diaphragm 34 and the control chambers 32, 54 together with a valve closing spring 44 which acts on the valve member 37, form a shut-off valve 24. The first control chamber 32 has a control connection 38 through which the control chamber 32 is alternatingly ventilated or loaded with a negative pressure. For this purpose, a connecting nipple 39 is inserted in the housing wall of the central part 26 and opens in the control chamber 32. Through a control conduit 40 shown in FIG. 1 it is alternatingly connected with the negative pressure source or is ventilated. For switching over from ventilation to negative pressure source, a not shown 3/2-way magnetic valve can be provided. The suction pipe negative pressure of the internal combustion engine is utilized for negative pressure supply of the control chamber 32, so that the control conduit 40 is led through the magnet valve to the suction pipe of the internal combustion engine.

A funnel-shaped housing part 41 is pressure tightly arranged on the bottom 263 of the central part 26 which contains the valve opening 28. At its end side it is shaped to form a coaxial connecting pipe 42 which encloses the valve outlet 23. The funnel-shaped housing part 41 encloses with its funnel part a second valve chamber 43 which communicates with the valve outlet 23. A transverse web 54 is arranged in the second valve chamber 43, and the valve closing spring 44 which is formed as a helical pressure spring is supported on the transverse web. The valve member 37 is plate-shaped and supports a ring-shaped flat seal 45. The valve member 36 abuts with the flat seal 45 against a valve spring in form of a flat spring 48. A ring seal 46 is mounted on the support piston 35 and tightly encloses the valve plunger 36. When the shut-off valve 24 is open, the support piston 35 abuts through the ring seal 46 against an abutment 47 formed on the intermediate wall 261 of the central part 26, and with the ring seal 46 formed as an O-ring seals the ring gap remaining the valve plunger 36 and the hollow pin 30. Thereby with the open shut-off valve 24, no leakage air can flow through the hollow piston 30 into the first control chamber 32 of the shut-off valve 24.

Figure 3:
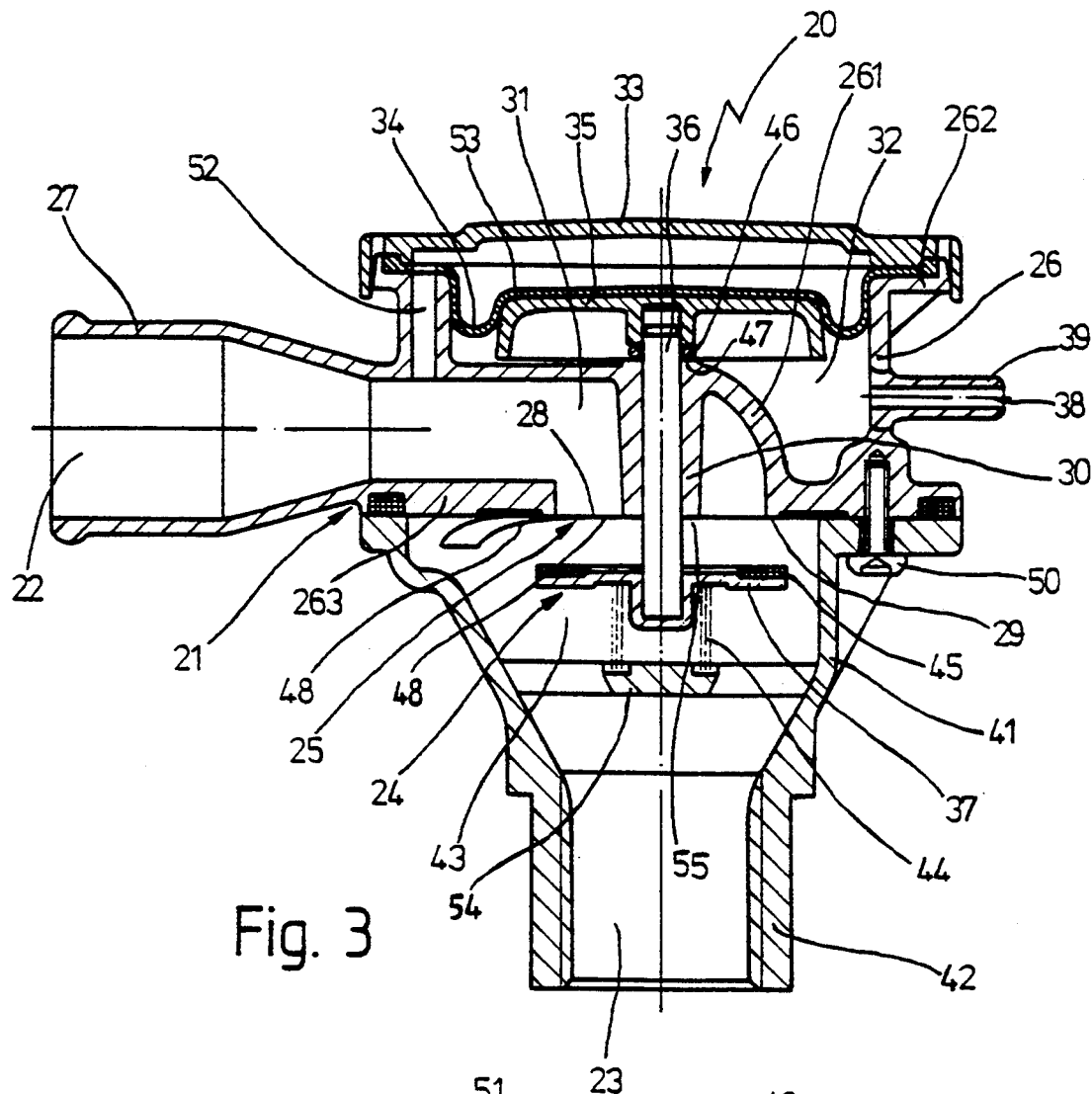
FIG. 3 is a view showing a longitudinal section of a combination valve in accordance with the present invention in an open position.
Figure 4:
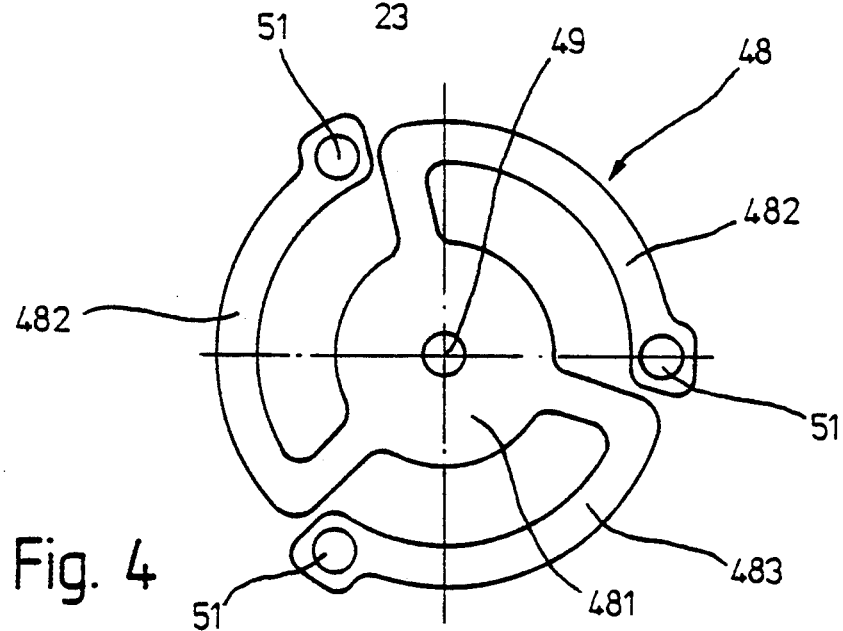
FIG. 4 is a plan view of a closing member of a check valve in the inventive combination valve formed as a flat spring.

As can be seen in particular from FIGS. 3 and 4, the closing member of the check valve 25 is formed as a valve spring, in particular a flat spring 48, which also cooperates with the valve seat 29. For this purpose the flat spring 48 has a central circular closing portion 481 with a central throughgoing opening 49 for the valve plunger 36, as well as three radially placed holding arms 482 on the closing portion 41. The holding arms are offset relative to one another by identical circumferential angles, they are substantially arcuate and extend concentrically to the closing portion 481. The free ends of the holding arms 482 are fixed between the central part 26 and the funnel-shaped housing part 41. For this purpose, the funnel-shaped housing part 41 is screwed to the central part 26 by screws 50 extending through punched openings 51 in the holding arms 482. The valve plunger 36 extends through the throughgoing opening 49 in the closing portion 481, so that the valve member 37 abuts against the side of the flat spring 48 which faces the valve outlet 23.

In the blocking condition of the check valve 25 the closing portion 481 of the flat spring 48 abuts against the valve seat 29 and against the ring-shaped end side of the hollow pin 30 which forms a further valve seat 55 and tightly closes the valve opening 28. When the shut-off valve 24 is also closed, the valve closing spring 44 presses additionally the flat spring 48 through the plate-shaped valve member 37 which has a greater diameter than the flat spring 48, to its closing position and increases its closing pressure. When the shut-off valve 24 is open, the plate shaped valve member 37 forms a so-called stroke guard for the flat spring 48 which limits its maximum opening stroke.

The above described combination valve operates in the following manner:

When the secondary air blower 15 is turned off, the control chamber 32 in the valve housing 21 is ventilated, and under the action of the valve closing spring 44, the shut-off valve 24 assumes a closed position shown in FIG. 2. In this position the flat spring 48 of the check valve 24, as described, is also pressed to its closed position. When the secondary air blower 15 is turned on, the control chamber 32 is connected with the negative pressure source. With build up of the negative pressure in the control chamber 32, the support piston 35 with the diaphragm 34 and the valve plunger 36 slide in FIG. 2 downwardly whereby the valve member 37 is lifted from the flat spring 48 and the valve opening 28 is released. The valve closing spring 44 is designed so that the shut-off valve 24 pulls the flat spring 48 in the closed position against the valve seat 29 up to a negative pressure of 300 hPa. The pressure in the valve inlet 22 produced by the secondary air blower 15 is supplied through the passage 52 into the second control chamber 53 and acts on the diaphragm 34 in a manner which supports the opening movement of the valve member 37. Therefore with lifting of the valve member 37 from the flat spring 48, the closing force of the valve spring 44 is overcome very fast. At the end of the opening movement the support piston 35 abuts through the ring seal 46 against the abutment 47 and seals in a known manner the ring gap between the valve plunger 36 and the hollow pin 30.

Due to the air pressure in the valve chamber 31 the flat spring 48 of the check valve 25 is lifted from the valve opening 28 and, being guided by the valve plunger 36, abuts against the valve member 37 which operates as a stroke guard. The secondary air produced by the secondary air blower 15 flows through the pressure conduit 18 into the exhaust gas line 11 of the internal combustion engine 10. When the pressure in the exhaust gas line 11 and thereby at the valve outlet 23 increases, the check valve 25 closes and prevents and a return flow of the exhaust gas through the blower. With the turning off of the secondary air blower 15 the control chamber 32 is ventilated, so that the valve closing spring 44 transfers the valve member 37 of the shut-off valve 24 to its closed position, and therefore simultaneously reliably closes the check valve 25 by pressing the flat spring 48 against the valve seats 29 and 55.

It will be understood that each of the elements described above, or two or more together, may also find a useful application in other types of constructions differing from the types described above.

While the invention has been illustrated and described as embodied in a combination valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A combination valve, in particular for secondary air blower of an internal combustion engine with a controlled three-way catalyst, the combination valve comprising a housing having a valve inlet and a valve outlet; a pneumatically actuated shut-off valve integrated in said valve housing and operative for blocking and releasing a flow between said valve inlet and said valve outlet, said shut-off valve having a valve member which is spring loaded in a valve closing direction; a check valve integrated in said valve housing and providing blocking of said flow from said valve outlet to said valve inlet, said check valve having a closing member formed by a flat spring and a stroke guard limiting an opening stroke of said closing member, said valve housing having a valve opening which is common for said shut-off valve and said check valve and formed in a flow path between said valve inlet and said valve outlet and also cooperating with said valve member and said flat spring for closing and opening said shut-off valve and said check valve, said valve member of said shut-off valve being arranged at a side of said flat spring which faces said valve outlet and forming said stroke guard of said check valve; a valve plunger axially guided in said valve housing and centrally extending through said flat spring; and a control piston with which said valve member is connected through said valve plunger and which is loaded with a suction pressure for opening said shut-off valve and ventilated for closing said shut-off valve, said control piston having a piston surface facing away from a suction pressure load and loaded by a pressure at said valve inlet.

2. A combination valve as defined in claim 1; and further comprising a valve closing spring which loads said valve member of said shut-off valve in said valve closing direction.

3. A combination valve as defined in claim 2, wherein said valve closing spring is formed as a pressure spring which is supported against said valve member and said valve housing and formed so that it holds said shut-off valve with said valve member in a closed position against said check valve up to a negative pressure of substantially 300 hPa.

4. A combination valve as defined in claim 1, wherein said control piston forms in said valve housing a first control chamber communicating with a control connection and a second control chamber communicating with said valve inlet, said control connection being alternatingly connectable with a negative pressure source and ventilatable.

5. A combination valve as defined in claim 4, wherein said valve plunger is mounted in said control piston and extends through said first control chamber; and further comprising a ring seal surrounding said valve plunger and mounted on said control piston, said ring seal in a valve opening position of said shut-off valve closing a ring gap remaining between an inlet opening of said valve plunger in said first control chamber.

6. A combination valve as defined in claim 5, wherein said valve housing has a housing surface which surrounds said inlet opening of said valve plunger and is provided with an abutment for said control piston, said ring seal being pressed against said shoulder.

7. A combination valve as defined in claim 6, wherein said ring seal is formed as an O-ring.

8. A combination valve as defined in claim 4, wherein said control piston includes a support piston which receives said valve plunger and a diaphragm mounted on said support piston and clamped at its edge side in said valve housing so as to air tightly separate said control chambers from one another.

9. A combination valve as defined in claim 1, wherein said flat spring has a central circular closing portion with a central throughgoing opening for said valve plunger and a plurality of radial holding arms which are offset on said closing portion by identical circumferential angles, said holding arms being substantially arcuate, extend concentrically relative to said closing portion and have free ends mounted in said housing.

10. A combination valve as defined in claim 9, wherein said holding arms include three such holding arms spaced from one another in the circumferential direction by 120°.

11. A combination valve, in particular for secondary air blower of an internal combustion engine with a controlled three-way catalyst, the combination valve comprising a housing having a valve inlet and a valve outlet; a pneumatically actuated shut-off valve integrated in said valve housing and operative for blocking and releasing a flow between said valve inlet and said valve outlet, said shut-off valve having a valve member which is spring loaded in a valve closing direction; a check valve integrated in said valve housing and providing blocking of said flow from said valve outlet to said valve inlet, said check valve having a closing member formed by a flat spring and a stroke guard limiting an opening stroke of said closing member, said valve housing having a valve opening which is common for said shut-off valve and said check valve and formed in a flow path between said valve inlet and said valve outlet and also cooperating with said valve member and said flat spring for closing and opening said shut-off valve and said check valve, said valve member of said shut-off valve being arranged at a side of said flat spring which faces said valve outlet and forming said stroke guard of said check valve; a valve plunger axially guided in said valve housing and centrally extending through said flat spring; and a control piston with which said valve member is connected through said valve plunger and which is loaded with a suction pressure for opening said shut-off valve and ventilated for closing said shut-off valve, said flat spring having a central circular closing portion with a central throughgoing opening for said valve plunger and a plurality of radial holding arms which are offset on said closing portion by identical circumferential angles, said holding arms being substantially arcuate, extend concentrically relative to said closing portion and have free ends mounted in said housing, said closing portion and said holding arms of said flat spring being formed as a one-piece metal sheet element with cutouts.

12. A combination valve, in particular for secondary air blower of an internal combustion engine with a controlled three-way catalyst, the combination valve comprising a housing having a valve inlet and a valve outlet; a pneumatically actuated shut-off valve integrated in said valve housing and operative for blocking and releasing a flow between said valve inlet and said valve outlet, said shut-off valve having a valve member which is spring loaded in a valve closing direction; a check valve integrated in said valve housing and providing blocking of said flow from said valve outlet to said valve inlet, said check valve having a closing member formed by a flat spring and a stroke guard limiting an opening stroke of said closing member, said valve housing having a valve opening which is common for said shut-off valve and said check valve and formed in a flow path between said valve inlet and said valve outlet and also cooperating with said valve member and said flat spring for closing and opening said shut-off valve and said check valve, said valve member of said shut-off valve being arranged at a side of said flat spring which faces said valve outlet and forming said stroke guard of said check valve; a valve plunger axially guided in said valve housing and centrally extending through said flat spring; and a control piston which which said valve member is connected through said valve plunger and which is loaded with a suction pressure for opening said shut-off valve and ventilated for closing said shut-off valve, said flat spring having a central circular closing portion with a central throughgoing opening for said valve plunger and a plurality of radial holding arms which are offset on said closing portion by identical circumferential angles, said holding arms being substantially arcuate, extend concentrically relative to said closing portion and have free ends mounted in said housing, said valve housing having a valve opening and a valve seat which surrounds said ventilating opening and forms a seat for said closing portion of said flat spring and for said valve member of said shut-off valve.

13. A combination valve as defined in claim 12, wherein said valve member of said shut-off valve is plate-shaped and overtensions said flat spring, said valve member having a diameter which is at least greater than an outer diameter of said closing portion of said flat spring; and further comprising a ring-shaped flat seal supported by said valve member in the region of its abutment surface against said flat spring and said valve seat.

14. A combination valve, in particular for secondary air blower of an internal combustion engine with a controlled three-way catalyst, the combination valve comprising a housing having a valve inlet and a valve outlet; a pneumatically actuated shut-off valve integrated in said valve housing and operative for blocking and releasing a flow between said valve inlet and said valve outlet, said shut-off valve having a valve member which is spring loaded in a valve closing direction; a check valve integrated in said valve housing and providing blocking of said flow from said valve outlet to said valve inlet, said check valve having a closing member formed by a flat spring and a stroke guard limiting an opening stroke of said closing member, said valve housing having a valve opening which is common for said shut-off valve and said check valve and formed in a flow path between said valve inlet and said valve outlet and also cooperating with said valve member and said flat spring for closing and opening said shut-off valve and said check valve, said valve member of said shut-off valve being arranged at a side of said flat spring which faces said valve outlet and forming said stroke guard of said check valve; a valve plunger axially guided in said valve housing and centrally extending through said flat spring; and a control piston with which said valve member is connected through said valve plunger and which is loaded with a suction pressure for opening said shut-off valve and ventilated for closing said shut-off valve, said flat spring having a central circular closing portion with a central through-going opening for said valve plunger and a plurality of radial holding arms which are offset on said closing portion by identical circumferential angles, said holding arms being substantially arcuate, extend concentrically relative to said closing portion and have free ends mounted in said housing, said valve housing having at least two parts separated from one another by a separating plane extending through said valve opening, said free ends of said holding arms of said flat spring being clamped between said housing parts in said separating plane.

* * * * *